Figure 1:
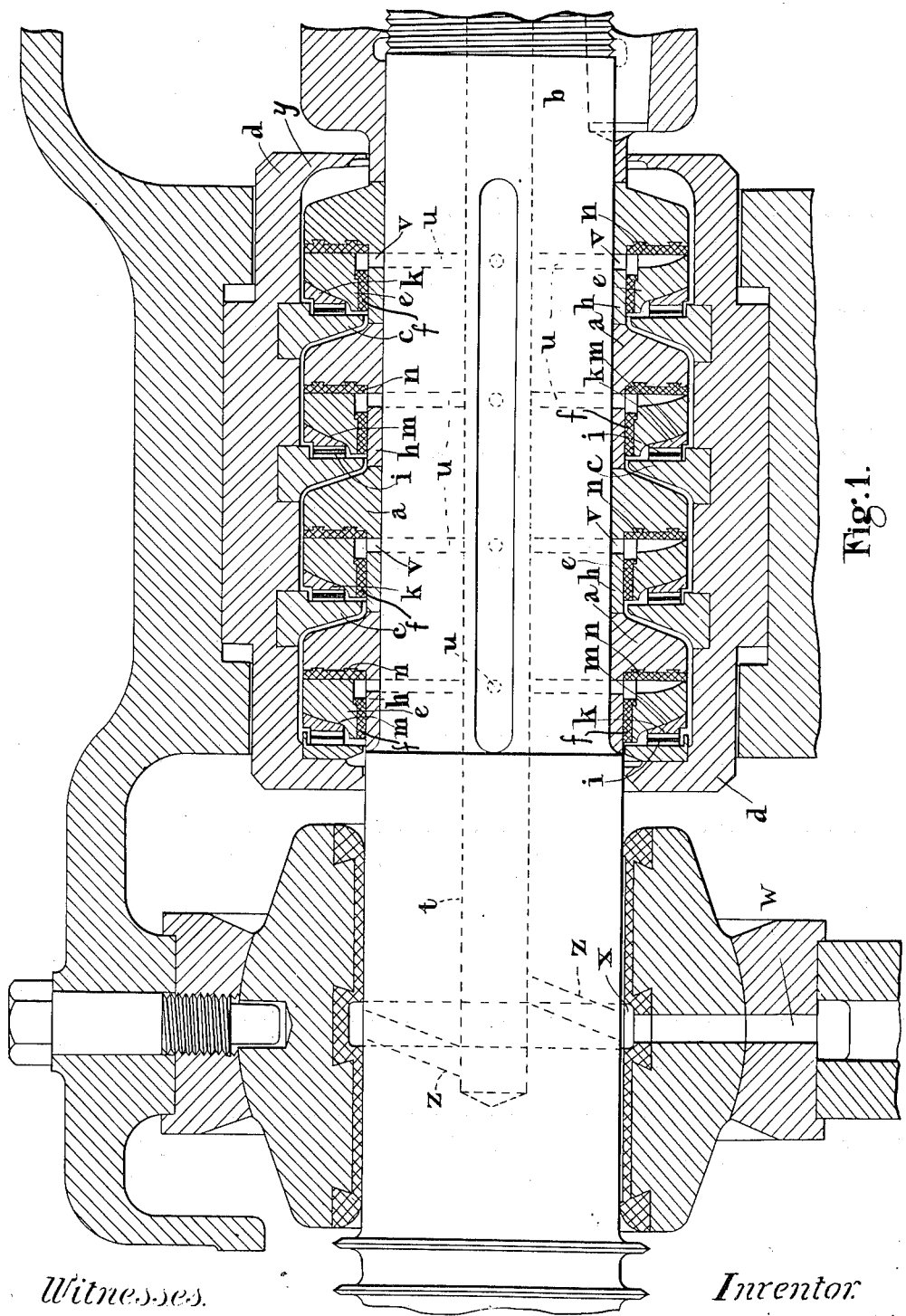

S. Z. DE FERRANTI.
THRUST BEARING.
APPLICATION FILED FEB. 23, 1911.

1,121,083.  Patented Dec. 15, 1914.
4 SHEETS—SHEET 1.

Witnesses.
Ewd L. Tolson
H. Alden

Inventor.
Sebastian Z. de Ferranti,
by Chas. Middleton Donaldson & Shear
Attorneys

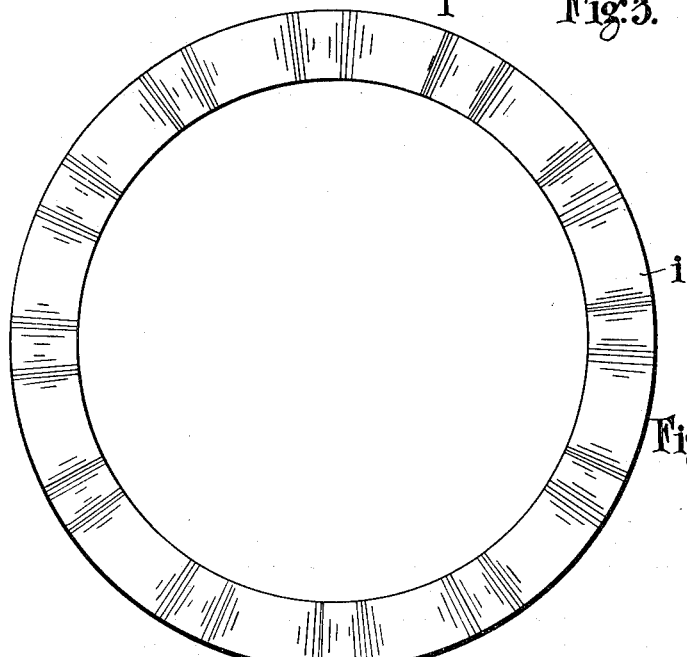
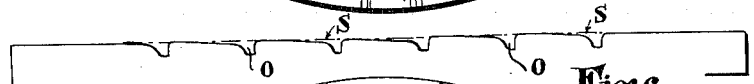
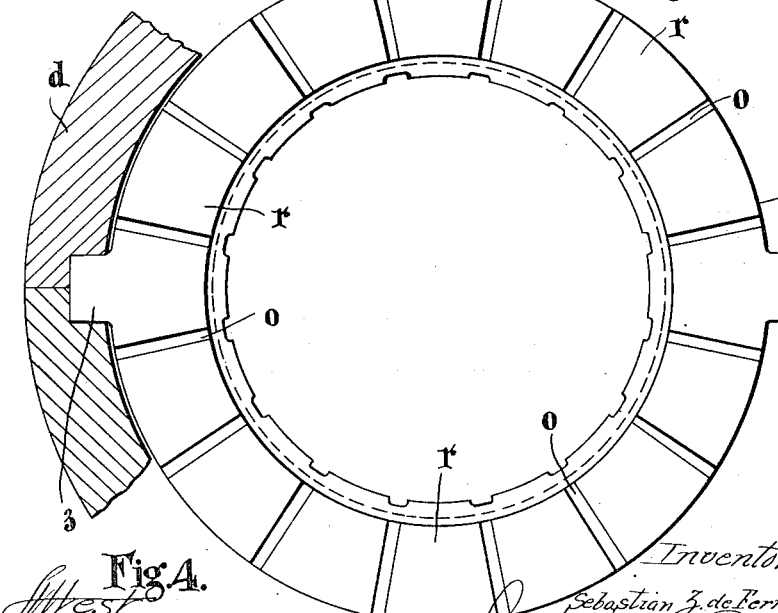

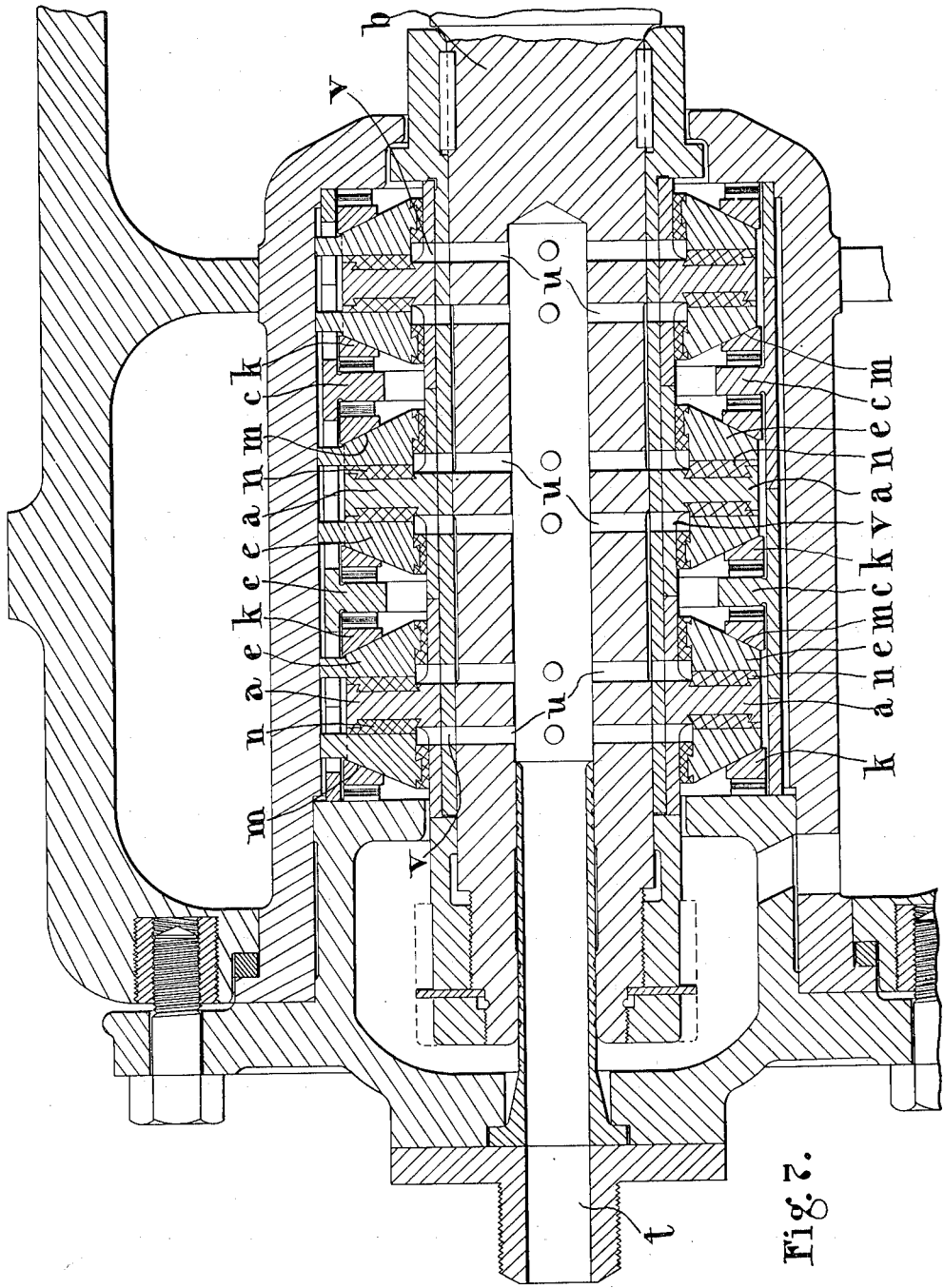

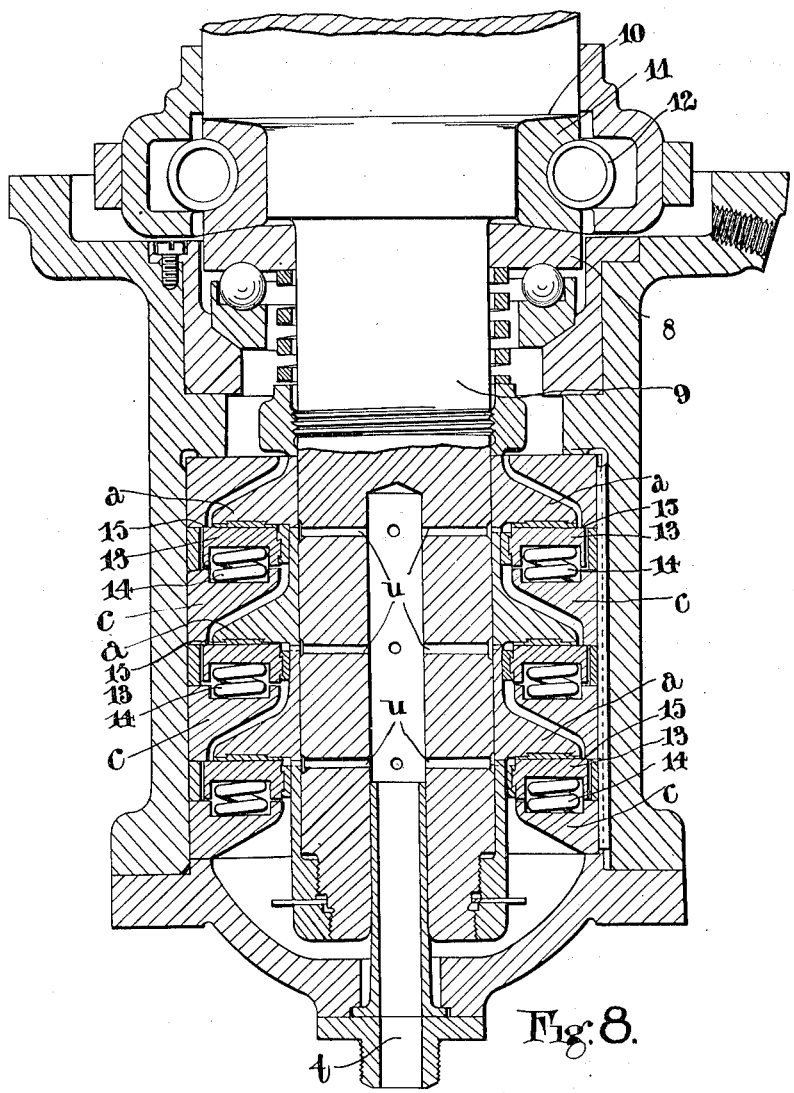

UNITED STATES PATENT OFFICE.

SEBASTIAN ZIANI DE FERRANTI, OF GRINDLEFORD BRIDGE, ENGLAND.

THRUST-BEARING.

1,121,083.   Specification of Letters Patent.   Patented Dec. 15, 1914.

Application filed February 23, 1911. Serial No. 610,333.

*To all whom it may concern:*

Be it known that I, SEBASTIAN ZIANI DE FERRANTI, a subject of the King of Great Britain and Ireland, and residing at Grindleford Bridge, in the county of Derby, England, have invented certain new and useful Improvements in Thrust-Bearings, of which the following is a specification.

This invention relates to thrust bearings and is applicable not only to thrust bearings proper but also to pivot or footstep bearings.

It is now well understood that in the case of an oil-lubricated journal, a film of oil is automatically maintained between the coacting bearing surfaces by virtue of the difference of pressure existing at different points and the drag exerted on the oil by the rotating part. In the type of bearing, however, to which the present invention relates and as ordinarily constructed the lower efficiency is believed to indicate that the introduction of oil between the working surfaces is more or less fortuitous and that the film of lubricant is constantly broken at one point or another.

An important feature of the present invention consists in a continuous or integral bearing ring, the face of which is divided into a number of sector-like parts by a series of oil-distributing grooves or ducts, the face of each sector being slightly inclined or eased at its leading edge to effect the automatic introduction of oil.

To obtain the best results, it is important that the oil grooves should extend across the full face of the bearing and that they should be of sufficient width to insure adherence of oil to the running surface as it passes, while at the same time the running surfaces between the grooves should be eased at entry and should be narrow enough to allow the automatic lubricating action indicated above to be effective in continually passing oil from one transverse groove to the next without being squeezed out. To secure a plentiful supply of oil for these objects it is advisable that apart from any forced lubrication that may be provided, the bearings proper should at all times be drowned in oil.

The invention also consists in a self-lubricating footstep bearing combined with appropriate means, preferably operated automatically, for taking the load below certain critical speeds.

The invention finally consists in the bearings and certain details and applications of the same hereinafter described and indicated.

Referring to the accompanying drawings, which form part of the specification, Figure 1 shows a sectional elevation of one form of the invention; Fig. 2 is a side elevation of a corrugated load-adjusting spring. Fig. 3 being a part development of the edge; Figs. 4 and 5 show a side elevation and cross section respectively of one of the standing rings, Fig. 6 showing a part sectional development of its working face; Fig. 7 shows a sectional elevation of a bearing adapted for cases in which a reversal of thrust occurs; while finally, Fig. 8 shows a sectional elevation of a footstep bearing constructed in accordance with the present invention.

The drawings are to a certain extent of a diagrammatic nature while the same reference symbols are used in the different figures to denote corresponding parts.

In carrying the invention into effect according to one form (see Fig. 1) suitable for taking the axial thrust of a turbine, a plurality of collars, $a$, are keyed to the turbine shaft, $b$, these collars alternating with a series of abutment collars, $c$, projecting inwardly from a suitable inclosing casing, $d$. In the spaces between the two sets of collars are arranged a number of standing rings, $e$, one to each space, the rings being bushed with white metal, $f$, to bear on appropriate extensions, $h$, of the shaft collars. A suitable spring device, $i$, is interposed between each inwardly projecting collar, $c$, and the coöperating standing ring, $e$, the spring preferably bearing not directly on the standing ring but on an intermediate ring, $k$, self-bedding thereon by virtue of the coacting spherical surfaces, $m$. The spring device $i$, (see Figs. 2 and 3) may very conveniently take the form of a corrugated or waved ring of spring steel but any other form may be used which is adapted to counteract or adjust any want of uniformity in the distribution of the load on the different collars and rings due to errors of workmanship, irregular expansion or other causes.

Turning now to the working faces of the standing rings, $e$, and shaft collars, $a$, of these the latter are lined with white metal, $n$, while the former are specially formed in accordance with the present invention.

The essential features on which depends the efficiency of a bearing constructed in accordance with the present invention have been indicated above and it will be seen that the underlying principles can be embodied in a variety of different structural forms; the following specific descriptions are therefore only to be taken as examples of forms of the invention which give good results in practice. Thus, taking one standing ring, $e$, (see Figs. 4, 5 and 6) its working face is provided with a large number of radially running grooves or ducts, $o$, for the distribution of oil, so as to divide the working face into sector-like parts, $r$, each of which is slightly eased or beveled from its leading edge rearwardly (see Fig. 6) so that a wedge-like space, $s$, is formed into which the oil is rolled or dragged by the action of the adjacent moving part.

It is found that good results are obtained by easing the leading edge to the extent of from three to five thousandths of an inch, but the amount and rearward extent of the easing may vary within comparatively wide limits according to the circumstances of the case.

It should be borne in mind that the easing should never be so small as to be obliterated by the maximum amount of wear of the working face allowable in any particular case or the lubricant will in effect be scraped off without entering between the working faces.

The oil may be conveniently fed under pressure to the distributing grooves or ducts, $o$, from an axial passage, $t$, in the shaft communicating with the ducts by lateral passages, $u$, through the shaft wall, suitable holes, $v$, being provided in the standing collars or where necessary to allow the circulation of the oil. In the example shown in Fig. 1, the axial passage, $t$, is indicated as fed through the oil inlet, $w$, annulus, $x$, and passages, $z$.

Centrifugal force acting on the oil in the passages, $u$, will assist the circulation which should be at least sufficient to conduct away any heat generated.

It will be seen that in the construction shown, all the bearing surfaces are continually drowned in oil (i. e., if the supply fails for the moment, the oil cannot flow away and leave the bearing dry), this result being secured by centrifugal force holding the oil in the spaces between the in-turned collars, $c$, or between a collar, $c$, and an in-turned flange, $y$, on the casing, $d$.

The casing, $d$, supporting the collars, $c$, is preferably made in halves, (see Fig. 4) and is provided with suitable recesses to receive corresponding projections, 3, in the standing rings in order to prevent the latter turning.

The present invention may readily be applied to cases where a reversal of the direction of thrust occurs, either by the use of two thrust blocks, one for each direction of motion, or by providing the shaft collars, $a$, with two working faces co-acting with appropriately designed self-oiling standing rings, $e$. In the latter case the abutment collars, $c$, may also be arranged with two working faces.

Thrust bearings of the type described work with a high efficiency and may therefore be utilized in conjunction with turbines in place of the usual balancing dummies. They are also very suitable for marine work and where a turbine drives a screw propeller through gearing, two such thrust bearings of the reversing type may be utilized, one on the turbine shaft, and the other on the propeller shaft or again in a case where the propeller is mounted on the turbine shaft and the thrust of the propeller is opposed to the turbine thrust, a self-oiling thrust bearing may be interposed to adjust the balance.

Self-oiling bearings as indicated are also applicable to pivot or footstep bearings but in such cases it is necessary to provide means for relieving the bearing of the dead-weight of the running parts at starting and stopping and at low speeds in order to allow the oil to penetrate between the working faces. Such means may be either hand-operated or automatic. According to one form of automatic gear suitable for the purpose, (see Fig. 8) above the footstep bearing is arranged a ball bearing, the upper member 8, of which has an inclined face above; a flange or collar secured to the vertical shaft, 9, has an oppositely inclined face, 10, below, a series of wedge-like sectors, 11, being interposed between the two inclined faces. These sectors are forced inward by a suitable spring, 12, or other means thereby causing the ball bearing to take the dead-weight of the moving parts below a certain speed whether at starting or stopping; above this speed, however, the sectors move outward under the influence of centrifugal force and allow the full load to come on the footstep.

Fig. 8 also shows another form of spring device for distributing the thrust between the different collars. According to this form a ring, 13, of channel section, with its working face formed in the manner above described, is disposed in contact with each thrust collar, $a$, while between each such thrust collar, $a$, and its co-acting abutment collar, ring, 13, and its co-acting abutment collar, $c$, are arranged a series of helical springs, 14, as shown. Each ring, 13, is pressed by its springs with a definite pressure equal to its share of the load against a shoulder, 15, on the corresponding abutment collar, $c$, when the shaft is transmitting no thrust to the bearing, the rings each taking their proper share as the load comes on.

It will be understood that the principles underlying the present invention may be embodied in other forms than those described specifically above.

Having now described my invention what I claim as new and desire to secure by Letters Patent is:—

1. In combination in a bearing, a plurality of rigid thrust members each having surfaces separated by lubricating ducts, each of said surfaces being eased on the lubricant-entry side for at least half the distance from one of said lubricating ducts to the next; and resilient means for distributing the total thrust between said thrust members, as set forth.

2. In combination in a bearing, a plurality of co-acting thrust members, one of which is formed in one piece with a plurality of thrust surfaces and intervening lubricating ducts, said surfaces being inclined at a small angle to the co-acting surface to leave therebetween a wedge-shaped space, together with means for supplying lubricant through said space, as set forth.

3. In a bearing, a rigid thrust ring having in rigid relation thereto a plurality of thrust-receiving members provided with thrust surfaces inclined slightly to the plane of said ring, as set forth.

4. In a bearing, a rigid thrust ring having in rigid relation thereto a plurality of sector-like thrust-receiving members properly separated by lubricating ducts, each of said thrust-receiving members having thrust surfaces inclined slightly to the plane of said ring, as set forth.

5. In a bearing, a one-piece thrust ring having a plurality of sector-like thrust surfaces separated by lubricating ducts, each of said sector-like surfaces having a plane portion in the plane of said ring and a second plane portion inclined slightly to the plane of said ring, the planes of said portions intersecting along a substantially radial line, as set forth.

6. In combination in a bearing, a plurality of rigid rings each having thrust-receiving portions separated by lubricating ducts, said portions being eased on the lubricant-entry side for at least half the distance from one of said lubricating ducts to the next; and resilient means for distributing the total thrust between said rings, as set forth.

In testimony whereof I have signed my name to this specification in the presence of two subscribing witnesses.

SEBASTIAN ZIANI DE FERRANTI.

Witnesses:
 LOUIS FRED NORRIE,
 WILLIAM DUNCAN DAVIDSON.